(12) United States Patent
Wotzak (10) Patent No.: US 10,563,530 B2
(45) Date of Patent: Feb. 18, 2020

(54) INTERSHAFT SEAL WITH DUAL OPPOSING CARBON SEAL RINGS

(71) Applicant: General Electric Company, Schenectady, NY (US)

(72) Inventor: Mark Gregory Wotzak, Chestnut Hill, MA (US)

(73) Assignee: General Electric Company, Schenectady, NY (US)

( * ) Notice: Subject to any disclaimer, the term of this patent is extended or adjusted under 35 U.S.C. 154(b) by 622 days.

(21) Appl. No.: 14/880,356

(22) Filed: Oct. 12, 2015

(65) Prior Publication Data

US 2017/0101879 A1 Apr. 13, 2017

(51) Int. Cl.
*F01D 11/00* (2006.01)
*F01D 5/02* (2006.01)

(52) U.S. Cl.
CPC ............ *F01D 11/003* (2013.01); *F01D 5/026* (2013.01); *F05D 2240/55* (2013.01); *F05D 2260/30* (2013.01)

(58) Field of Classification Search
CPC ............................... F01D 5/026; F01D 11/003
See application file for complete search history.

(56) References Cited

U.S. PATENT DOCUMENTS

| | | | |
|---|---|---|---|
| 4,211,424 A * | 7/1980 | Stein | F01D 11/003 277/352 |
| 4,754,984 A | 7/1988 | Keba | |
| 5,201,844 A | 4/1993 | Greenwood et al. | |
| 5,537,814 A | 7/1996 | Nastuk et al. | |
| 6,196,790 B1 | 3/2001 | Sheridan et al. | |
| 7,837,199 B2 * | 11/2010 | Craig | F01D 11/003 277/370 |
| 8,100,403 B2 | 1/2012 | Short | |
| 8,100,666 B2 | 1/2012 | Makuszewski | |
| 8,186,688 B2 * | 5/2012 | Akiyama | F16J 15/3412 277/362 |
| 8,205,891 B2 | 6/2012 | Vasagar | |
| 8,408,555 B2 | 4/2013 | Garrison | |
| 9,194,424 B2 * | 11/2015 | Garrison | F16C 32/0607 |
| 9,410,429 B2 * | 8/2016 | Watson | F01D 5/026 |
| 9,587,501 B2 * | 3/2017 | Zheng | F01D 11/003 |

(Continued)

*Primary Examiner* — Carlos A Rivera
*Assistant Examiner* — Cameron A Corday
(74) *Attorney, Agent, or Firm* — Dority & Manning, P.A.

(57) ABSTRACT

An intershaft seal assembly including first and second or forward and aft carbon face seal rings supported on an annular housing and having first and second seal faces facing in opposite directions. Forward and aft springs operably disposed between housing and carbon face seal rings for biasing or urging carbon face seal rings in opposite directions. Annular forward and aft carriers mounted on and supported by annular housing and supporting carbon face seal rings. Forward and aft springs operably disposed between housing and the forward and aft carriers respectively. The springs may be wave springs. Inner and outer secondary seals may include inner and outer O rings disposed in annular inner and outer grooves in annular inner and outer surfaces in housing respectively and in sealing engagement with the forward and aft carriers. Carriers may be integral with carbon face seal rings in monolithic combined seal and carrier elements.

20 Claims, 8 Drawing Sheets

(56) References Cited

U.S. PATENT DOCUMENTS

| | | | |
|---|---|---|---|
| 2007/0085278 A1* | 4/2007 | Davis | F01D 25/183 |
| | | | 277/411 |
| 2012/0261887 A1 | 10/2012 | Vasagar | |
| 2013/0034438 A1 | 2/2013 | Jahn | |
| 2014/0049010 A1 | 2/2014 | Jahn et al. | |
| 2014/0091535 A1 | 4/2014 | Cusack et al. | |
| 2017/0362949 A1* | 12/2017 | Von Berg | F01D 11/003 |

* cited by examiner

INTERSHAFT SEAL WITH DUAL OPPOSING CARBON SEAL RINGS

TECHNICAL FIELD

The present invention relates generally to intershaft air and oil seals and, more specifically, for such seals carbon sealing elements.

BACKGROUND INFORMATION

Air or oil sealing is often required between two opposing shafts such as is found in gas turbine engines. Sometimes, there is very little axial room in the available space to package and locate radial intershaft seals such as labyrinth seals.

Thus, there continues to be a need for air and oil intershaft seals which provide lighter weight seal assemblies that occupy smaller volumes with less leakage than labyrinth seals and other conventional seals. It is desirable to provide intershaft sealing in a tight design space that would otherwise require a less desirable seal such as a labyrinth seal between concentric shafts.

BRIEF DESCRIPTION OF THE INVENTION

An intershaft seal assembly includes first and second or forward and aft carbon face seal rings supported on an annular housing, first and second seal faces of the first and second or forward and aft carbon face seal rings facing in opposite first and second directions respectively, and forward and aft springs operably and axially disposed between the annular housing and the forward and aft carbon face seal rings for biasing or urging the forward and aft carbon face seal rings in the opposite first and second directions respectively. The intershaft seal assembly is circumscribed about an axis or engine centerline.

Annular forward and aft carriers mounted on and supported by the annular housing support the first and second or forward and aft carbon face seal rings respectively and the forward and aft springs are operably and axially disposed between the annular housing and the forward and aft carriers respectively. The forward and aft springs may be wave springs.

The assembly may include inner and outer secondary seals including radially inner and outer O rings disposed in annular radially inner and outer grooves in annular radially inner and outer surfaces in the housing respectively and in sealing engagement with the forward and aft carriers.

The forward and aft carriers may be integral with the forward and aft carbon face seal rings in monolithic combined seal and carrier elements.

A shaft and seal assembly includes the intershaft seal assembly sealing and disposed across an annular gap between axially spaced apart forward and aft shafts. The first and second or forward and aft carbon face seal rings may be positioned to seal directly against the forward and aft shafts respectively or positioned to seal against forward and aft running rings mounted on the forward and aft shafts respectively.

A gas turbine engine assembly includes a high pressure gas generator having a high pressure rotor and a high pressure turbine, a stub shaft at a front end of the high pressure rotor, a low pressure turbine downstream of the high pressure turbine joined by a low pressure drive shaft to a power output shaft, and an intershaft seal assembly sealing and disposed across an annular gap between the axially spaced apart power output shaft and the stub shaft. The intershaft seal assembly includes first and second or forward and aft carbon face seal rings supported on an annular housing, first and second seal faces of the first and second or forward and aft carbon face seal rings facing in opposite first and second directions respectively, forward and aft springs operably and axially disposed between the annular housing and the forward and aft carbon face seal rings for biasing or urging the forward and aft carbon face seal rings in the opposite first and second directions respectively, and the first and second or forward and aft carbon face seal rings positioned to seal directly against the power output shaft and the stub shaft respectively or positioned to seal against forward and aft running rings mounted on the power output shaft and the stub shaft respectively.

DETAILED DESCRIPTION OF THE INVENTION

Figure 1:
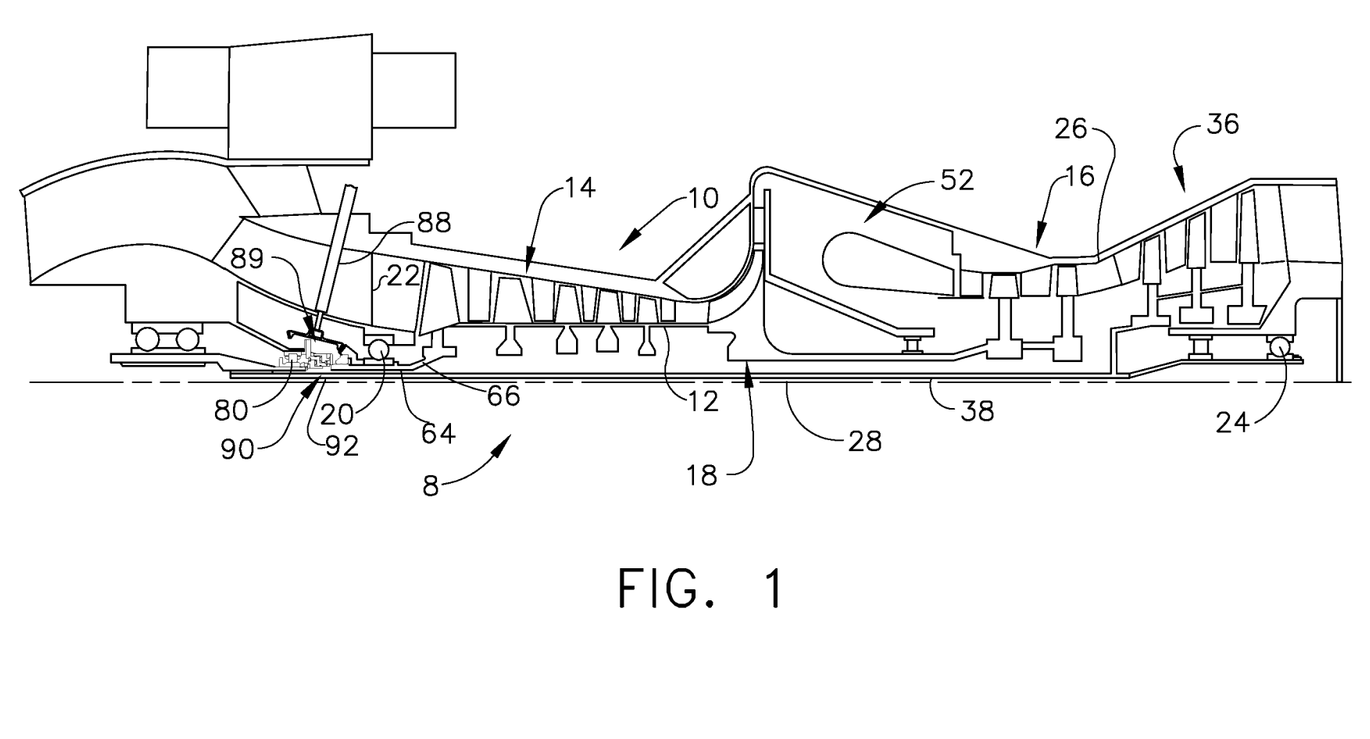
FIG. 1 is a sectional view illustration of a gas turbine engine having an intershaft seal assembly with dual opposing carbon face seal rings.

Illustrated in FIG. 1, gas turbine engine assembly 8 with a high pressure gas generator 10 having a single stage centrifugal compressor 18 as a final compressor stage. The high pressure gas generator 10 has a high pressure rotor 12 including, in downstream flow relationship, a high pressure compressor 14, a combustor 52, and a high pressure turbine 16. The rotor 12 is rotatably supported about an engine centerline 28 by a first or forward bearing 20 in a front frame 22 and a rear bearing 24 disposed downstream of the high pressure turbine 16 in a turbine frame 26.

Figure 2:
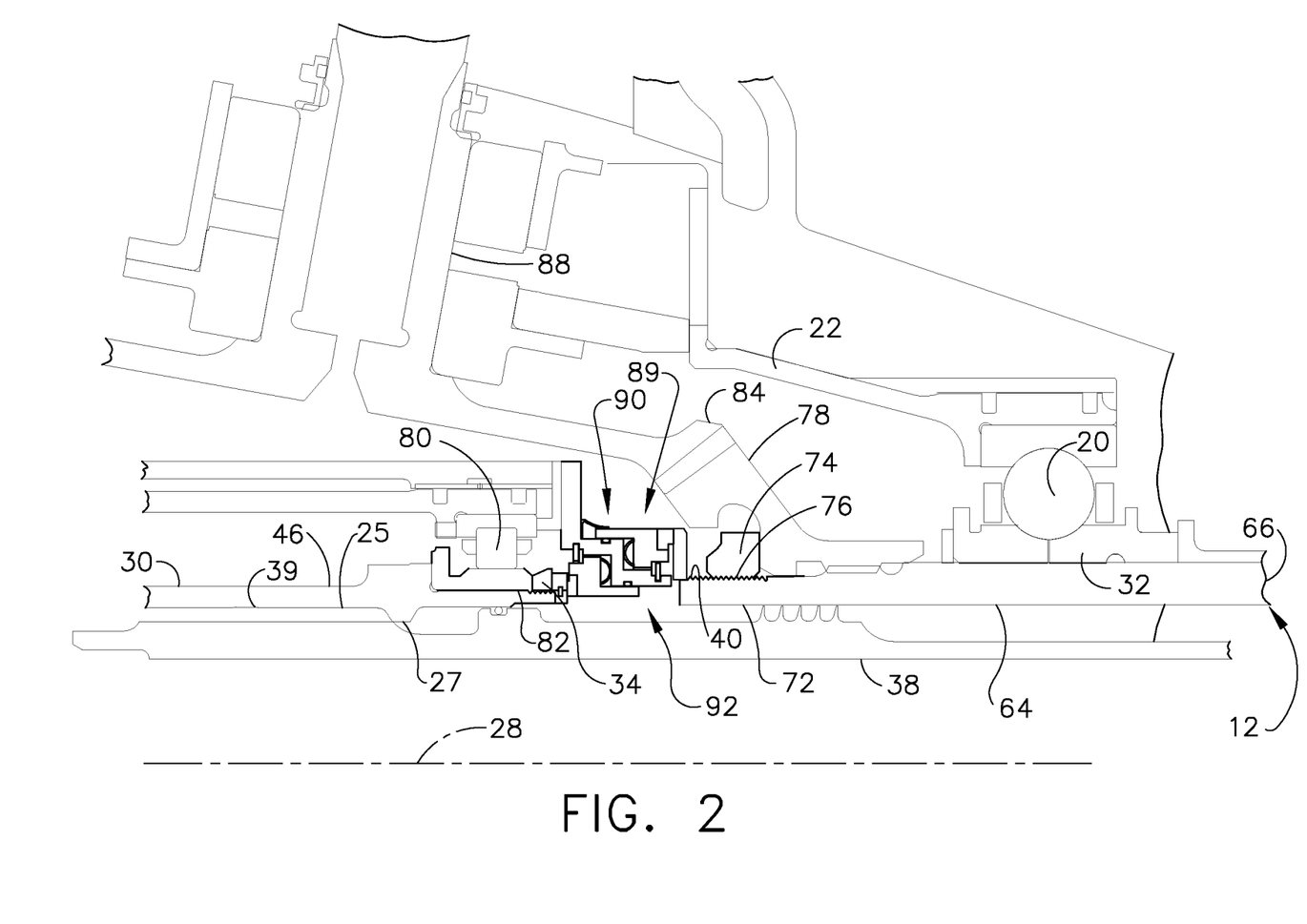
FIG. 2 is an enlarged sectional view illustration of the intershaft seal assembly illustrated in FIG. 1.

Referring further to FIG. 2, a stub shaft 64 is located at a front end 66 of the high pressure rotor 12 to which it is connected. A high pressure lock-nut 74 is threaded on forward threads 76 on a forward end 72 of the stub shaft 64. The high pressure lock-nut 74 is used to tighten, secure, and clamp together and place in compression a horizontal bevel gear 78 and a ball bearing inner race 32 of the forward bearing 20 rotatably supporting the stub shaft 64. The horizontal bevel gear 78 drivingly engages a power take-off bevel gear 84 fixedly attached to a power take-off shaft 88.

Figure 3:
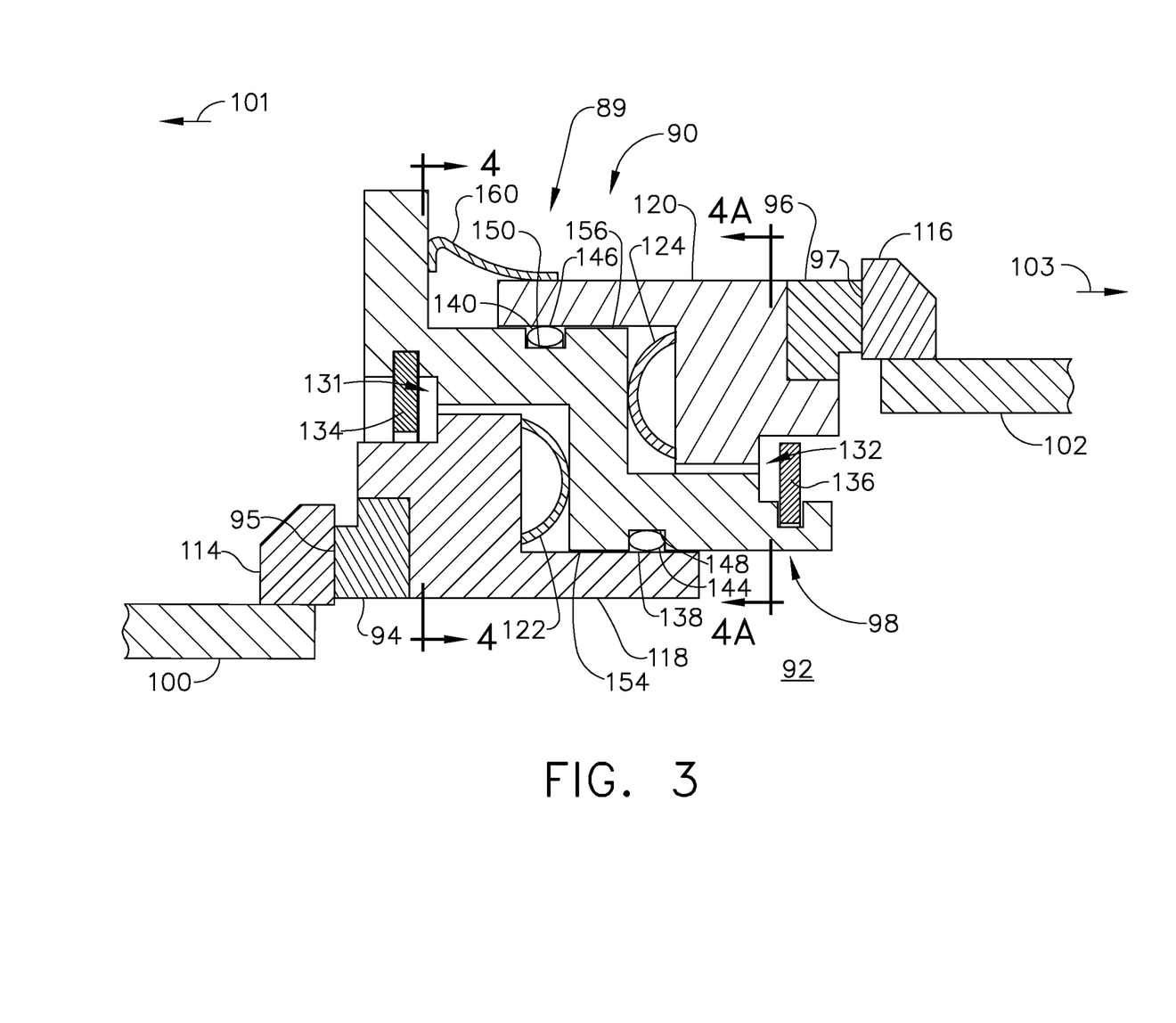
FIG. 3 is a perspective view diagrammatical illustration of the intershaft seal assembly illustrated in FIG. 2.

Referring to FIGS. 1, 2, and 3, a low pressure turbine (LPT) 36 downstream of the high pressure turbine 16 is joined by a low pressure drive shaft 38 to a power output shaft 30 rotatably supported by an output shaft bearing 80. The low pressure drive shaft 38 is located radially within and joined to the power output shaft 30 by a splined joint 39. The splined joint 39 includes mating inner and outer splines 25, 27 extending radially outwardly and inwardly from the low pressure drive shaft 38 and the power output shaft 30 respectively. The splined joint 39 connects the low pressure drive shaft 38 to an aft end 46 of the power output shaft 30. An aft power shaft lock-nut 34 threaded on aft threads 40 on the aft end 46 of the power output shaft 30 is used to tighten, secure, and clamp together the power output shaft 30 and a roller bearing inner race 82 of the output shaft bearing 80.

A shaft and seal assembly 89 includes an annular intershaft seal assembly 90 which provides an air and/or oil seal between two shafts illustrated herein as the power output shaft 30 and the stub shaft 64. The intershaft seal assembly 90 is circumscribed about an axis such as engine centerline 28. The intershaft seal assembly 90 may also be used with other types of shafts in other applications and machinery. The high pressure lock-nut 74 is spaced axially apart from and downstream or aft of the aft power shaft lock-nut 34. The stub shaft 64 radially surrounds and is concentric with the power output shaft 30. The stub shaft 64 is spaced axially apart from and downstream or aft of the power output shaft 30. An intershaft annular gap 92 extends axially between the stub shaft 64 and the power output shaft 30.

Figure 5:
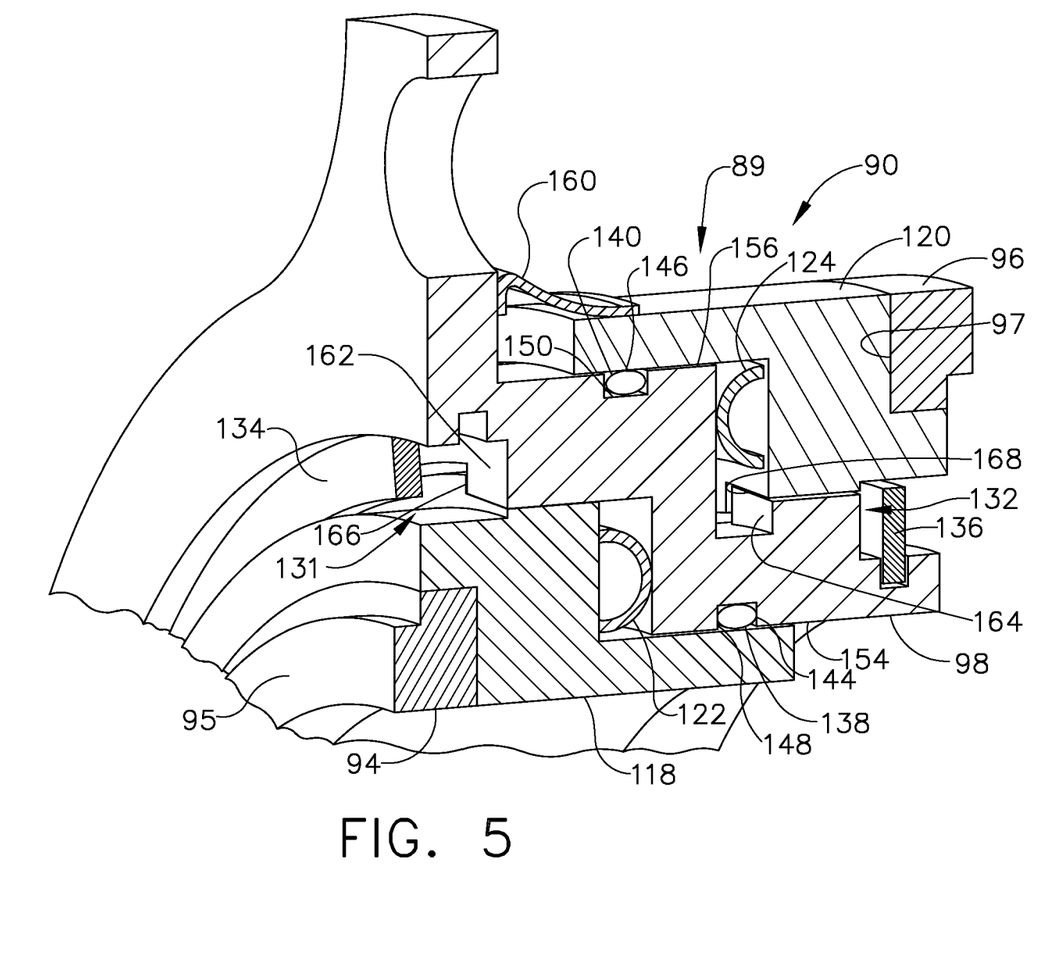
FIG. 5 is an enlarged diagrammatical view illustration of an alternative intershaft seal assembly including the carbon face seal elements sealing against spaced apart shafts illustrated in FIG. 4.

Referring to FIGS. 2, 3, and 5, the intershaft seal assembly 90 provides sealing across the intershaft annular gap 92. The intershaft seal assembly 90 may be used to provide sealing across the annular gap 92 between a great many types of axially spaced apart forward and aft shafts 100, 102 as illustrated in FIG. 3. The intershaft seal assembly 90 includes opposing forward or first and second or aft carbon face seal rings 94, 96 supported on a single annular housing 98. The first and second or forward and aft carbon face seal rings 94, 96 have first and second seal faces 95, 97 that face in opposite first and second directions 101, 103 illustrated herein as axially forward and aft directions.

Figure 3A:
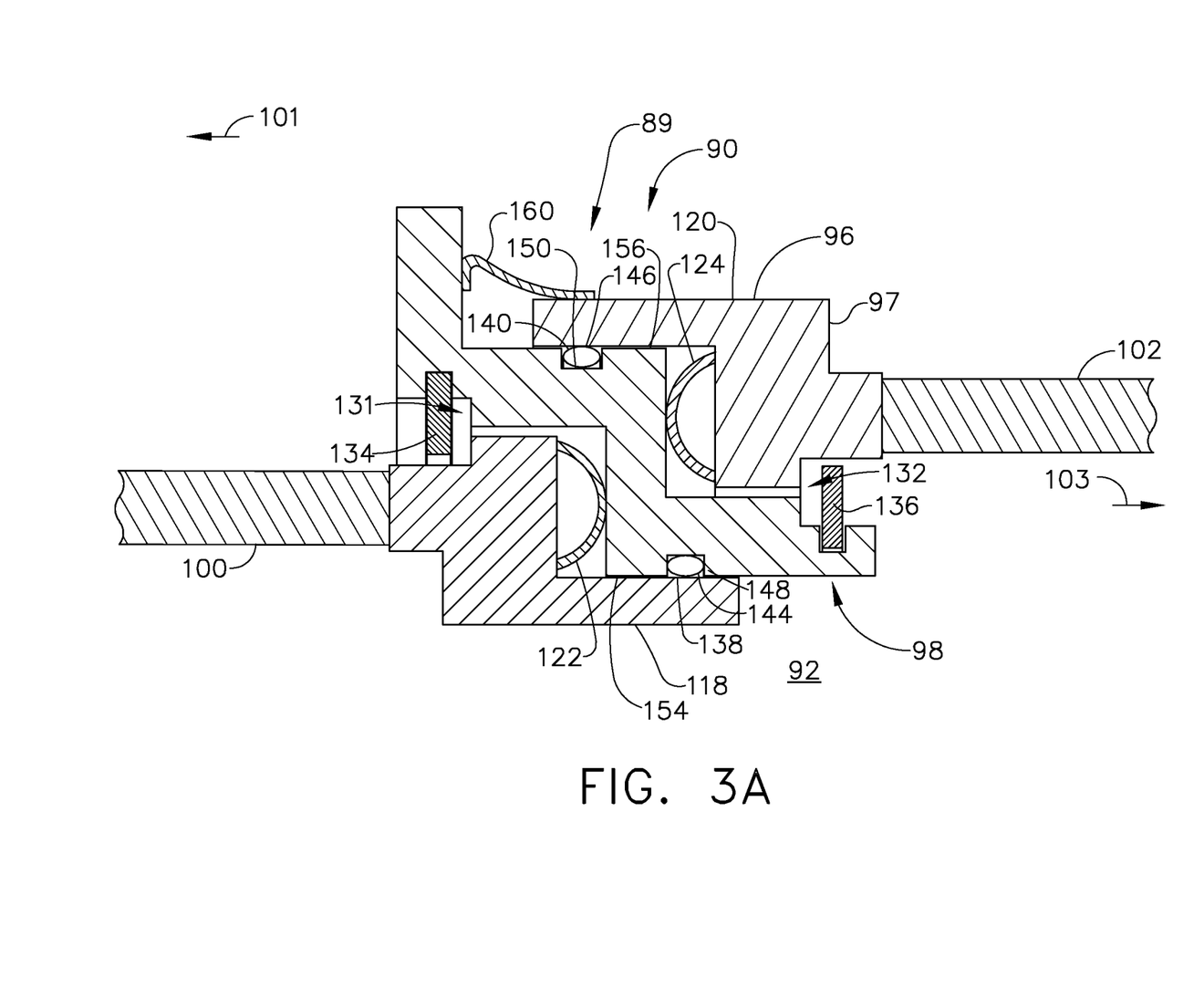
FIG. 3A is a perspective view diagrammatical illustration of an alternative intershaft seal assembly illustrated in FIG. 2 with the carbon face seal rings sealing directly against two opposing rotating forward and aft shafts.
Figure 7:
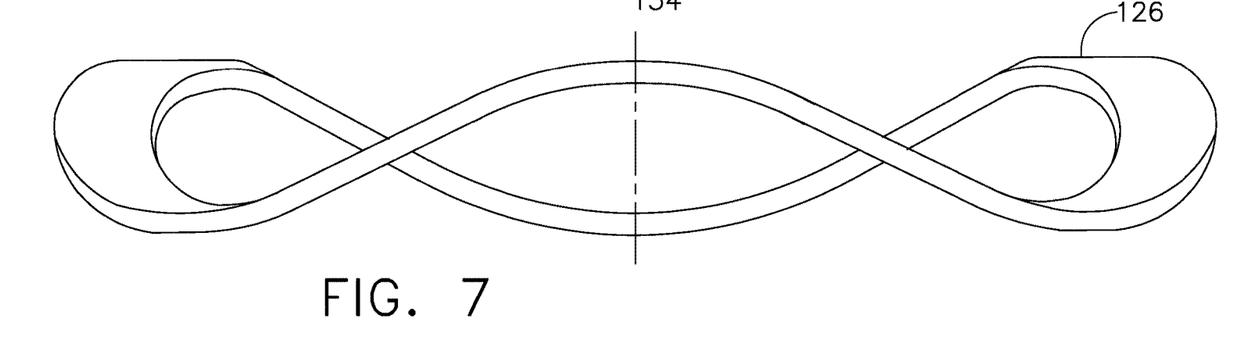
FIG. 7 is a perspective view illustration of a wave spring illustrated in FIG. 5.

The forward and aft carbon face seal rings 94, 96 may seal against forward and aft running rings 114, 116 mounted on the forward and aft shafts 100, 102 respectively as illustrated in FIG. 3. Alternatively, the forward and aft carbon face seal rings 94, 96 may seal directly against the two opposing rotating forward and aft shafts 100, 102 respectively as illustrated in FIG. 3A. The forward and aft carbon face seal rings 94, 96 may be supported by annular forward and aft carriers 118, 120 that may be metallic and are backed by forward and aft springs 122, 124 mounted on and supported by the single annular housing 98. The forward and aft springs 122, 124 are operably disposed between the forward and aft carriers 118, 120 annular housing 98 for biasing or urging the forward and aft carbon face seal rings 94, 96 in opposite directions to seal against the forward and aft running rings 114, 116 mounted on the forward and aft shafts 100, 102 respectively as illustrated in FIG. 3 or alternatively to seal directly against the forward and aft shafts 100, 102 respectively as illustrated in FIG. 3A. The forward and aft springs 122, 124 may be annular wave springs 126 as illustrated in FIG. 7. The annular wave springs are circumscribed about the axis or engine centerline 28.

Figure 4:
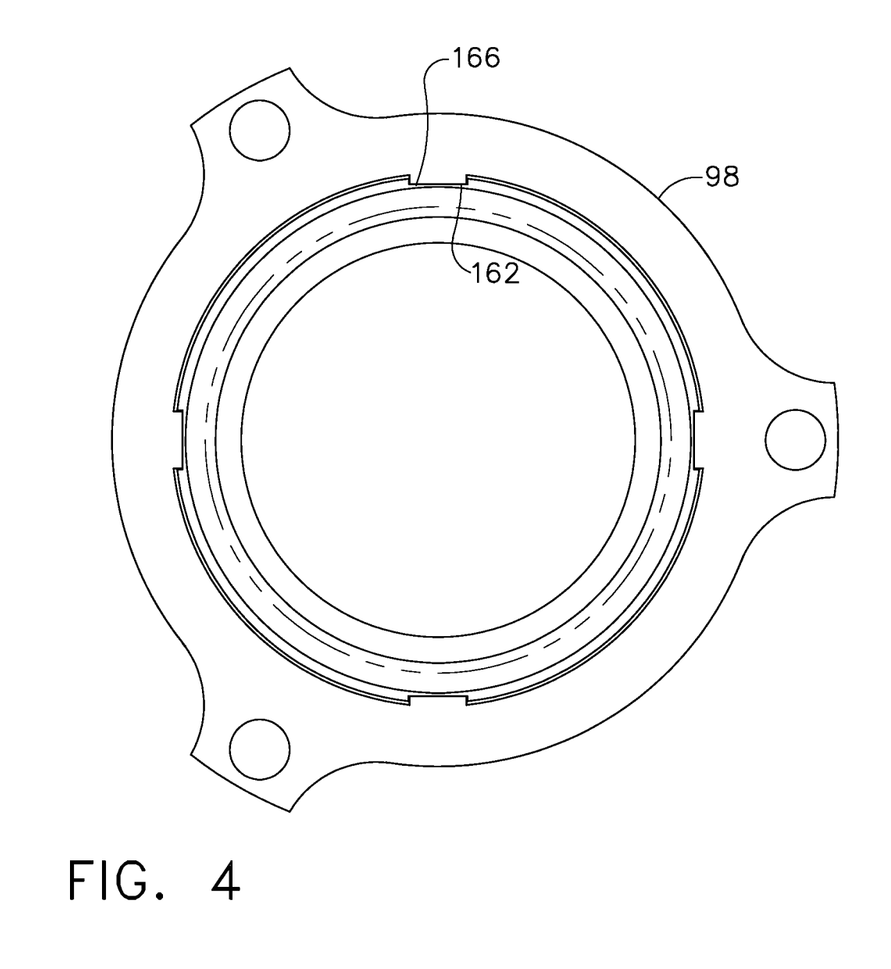
FIG. 4 is an axially forward looking aft diagrammatical sectional view illustration of the intershaft seal assembly through 4-4 in FIG. 3.
Figure 4A:
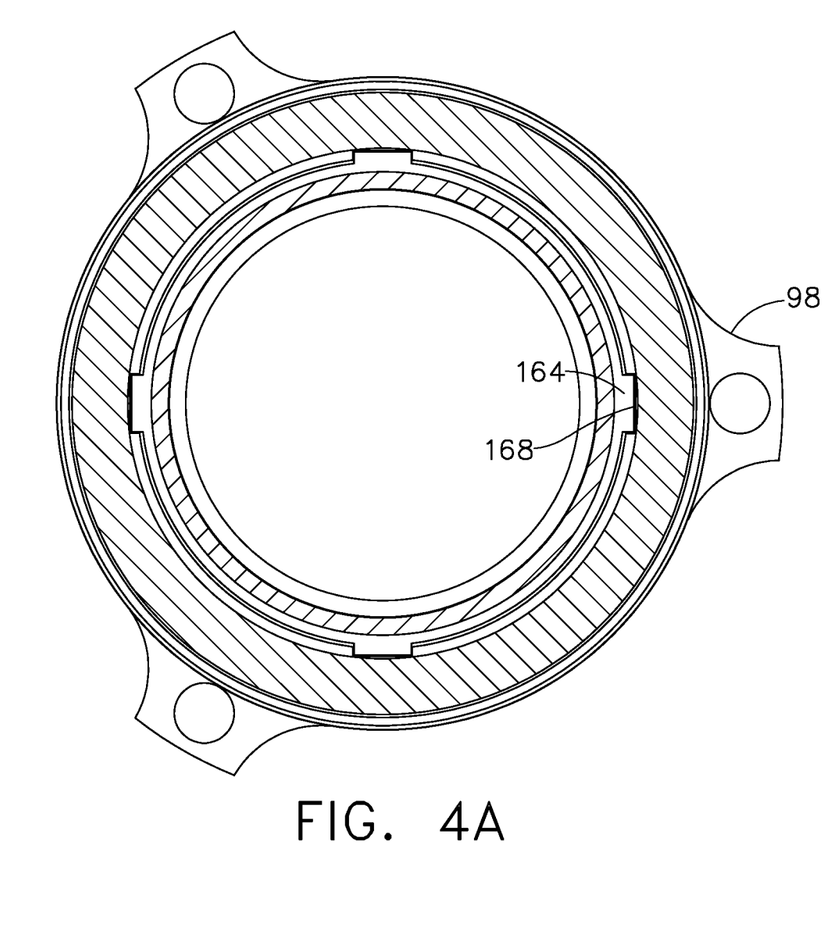
FIG. 4A is an axially forward looking aft diagrammatical sectional view illustration of the intershaft seal assembly through 4A-4A in FIG. 3.

Referring to FIGS. 2, 3, 3A, 4 and 4A, the forward and aft carriers 118, 120 are guided by forward and aft track and rail assemblies 131, 132 or some other mechanism to allow the forward and aft metal carriers 118, 120 to ride on the housing 98 and are axially contained by forward and aft retaining rings 134, 136 respectively. The forward and aft track and rail assemblies 131, 132 are illustrated in FIGS. 4 and 4A respectively and 5. The forward and aft track and rail assemblies 131, 132 include forward and aft rails 162, 164 slidingly engaging and disposed in forward and aft tracks 166, 168. The rails and tracks may be described as axially extending protrusions and slots respectively.

Radially inner and outer secondary seals 138, 140 such as O rings or metal bellows may be incorporated into the design. The inner and outer secondary seals 138, 140 illustrated herein include radially inner and outer O rings 144, 146 disposed in annular radially inner and outer grooves 148, 150 in annular radially inner and outer surfaces 154, 156 in the housing 98 respectively. The inner and outer O rings 144, 146 are in sealing engagement with the aft and forward carriers 120, 118 respectively and the housing 98.

Debris covers 160 may be incorporated to prevent any hard particles into the secondary seals system. The mating surface may be of the hydrodynamic or lift-off type, where there is no physical contact at speed between the carbon element and the mating ring or end of shaft.

Figure 6:
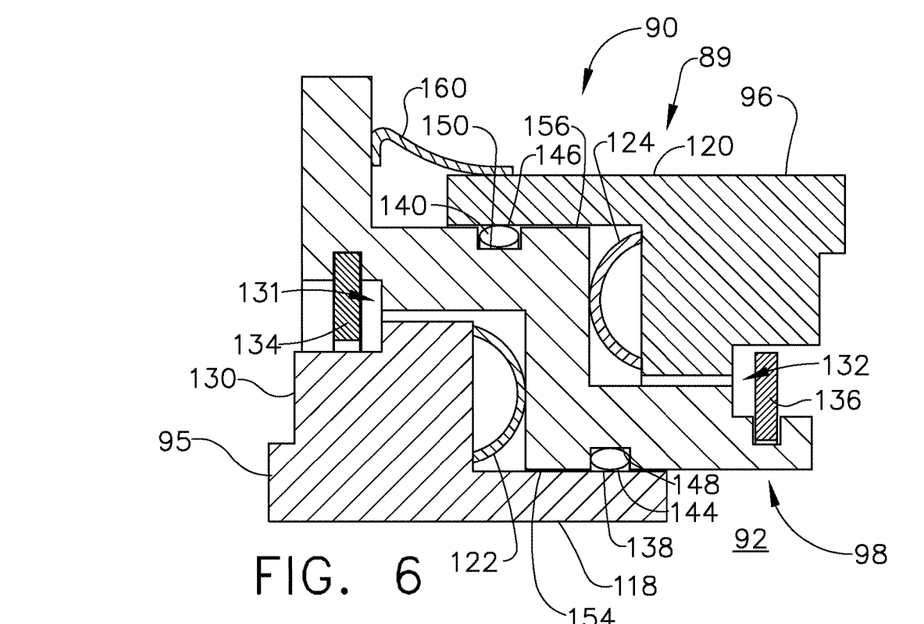
FIG. 6 is an enlarged diagrammatical sectional view illustration of another alternative intershaft seal assembly including the carbon face seal elements sealing directly against spaced apart shafts illustrated in FIG. 4.

Illustrated in FIG. 6 is an alternative embodiment of the annular intershaft seal assembly 90 including forward and aft carbon face seal rings 94, 96 integral with the forward and aft carriers 118, 120 in monolithic combined seal and carrier elements 130. This integrates the carbon face seal rings with the carriers into a single piece monolithic combined seal and carrier element 130 backed by a spring such as one of the forward and aft springs 122, 124.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed:

1. An intershaft seal assembly comprising:
   first and second carbon face seal rings supported on an annular housing,
   first and second seal faces of the first and second carbon face seal rings facing in opposite axial first and second directions along an engine centerline respectively, and
   first and second springs operably and axially disposed between the annular housing and the first and second carbon face seal rings, wherein the first spring is axially engaged with a first portion of the annular housing and the second spring is axially engaged with a second portion of the annular housing, wherein the first spring biases the first carbon face seal ring in the axial first direction and the second spring biases the second carbon face seal ring in the axial second direction opposite the axial first direction.

2. The assembly as claimed in claim 1, further comprising:
   annular first and second carriers mounted on and supported by the annular housing,
   the first and second carriers supporting the first and second carbon face seal rings respectively, and the first and second springs operably and axially disposed between the annular housing and the first and second carriers respectively.

3. The assembly as claimed in claim 2, wherein the first and second springs are wave springs.

4. The assembly as claimed in claim 2, further comprising inner and outer secondary seals including inner and outer O rings disposed in annular inner and outer grooves in annular inner and outer surfaces along a radial direction in the housing respectively and in sealing engagement with the first and second carriers.

5. The assembly as claimed in claim 4, wherein the first and second springs are wave springs.

6. The assembly as claimed in claim 1, further comprising monolithic combined seal and carrier elements including first and second carriers integral with the first and second carbon face seal rings.

7. The assembly as claimed in claim 6, further comprising inner and outer secondary seals including inner and outer O rings disposed in annular inner and outer grooves in annular inner and outer surfaces along a radial direction in the housing respectively and in sealing engagement with the first and second carriers.

8. The assembly as claimed in claim 7, wherein the first and second springs are wave springs.

9. A shaft and seal assembly comprising:
an intershaft seal assembly sealing and disposed across an annular gap between axially spaced apart first and second shafts,
the intershaft seal assembly including first and second carbon face seal rings supported on an annular housing,
first and second seal faces of the first and second carbon face seal rings facing in opposite axial first and second directions along an engine centerline respectively, and
first and second springs operably and axially disposed between the annular housing and the first and second carbon face seal rings, wherein the first spring is axially engaged with a first portion of the annular housing and the second spring is axially engaged with a second portion of the annular housing, wherein the first spring biases the first carbon face seal ring in the axial first direction and the second spring biases the second carbon face seal ring in the axial second direction opposite the axial first direction.

10. The assembly as claimed in claim 9, wherein the first and second carbon face seal rings are positioned to seal directly against the first and second shafts respectively or are positioned to seal against first and second running rings mounted on the first and second shafts respectively.

11. The assembly as claimed in claim 9, further comprising:
annular first and second carriers mounted on and supported by the annular housing,
the first and second carriers supporting the first and second carbon face seal rings respectively, and
the first and second springs operably and axially disposed between the annular housing and the first and second carriers respectively.

12. The assembly as claimed in claim 11, wherein the first and second springs are wave springs.

13. The assembly as claimed in claim 11, further comprising inner and outer secondary seals including inner and outer O rings disposed in annular inner and outer grooves in annular inner and outer surfaces along a radial direction in the housing respectively and in sealing engagement with the first and second carriers.

14. The assembly as claimed in claim 13, wherein the first and second springs are wave springs.

15. The assembly as claimed in claim 9, further comprising monolithic combined seal and carrier elements including first and second carriers integral with the first and second carbon face seal rings.

16. The assembly as claimed in claim 15, further comprising inner and outer secondary seals including inner and outer O rings disposed in annular inner and outer grooves in annular inner and outer surfaces along a radial direction in the housing respectively and in sealing engagement with the first and second carriers.

17. The assembly as claimed in claim 16, wherein the first and second springs are wave springs.

18. A gas turbine engine assembly comprising:
a high pressure gas generator including a high pressure rotor and a high pressure turbine,
a stub shaft at a front end of the high pressure rotor,
a low pressure turbine downstream of the high pressure turbine joined by a low pressure drive shaft to a power output shaft,
an intershaft seal assembly sealing and disposed across an annular gap between the axially spaced apart power output shaft and the stub shaft,
the intershaft seal assembly including first and second carbon face seal rings supported on an annular housing,
first and second seal faces of the first and second carbon face seal rings facing in opposite axial first and second directions along an engine centerline respectively,
first and second springs operably and axially disposed between the annular housing and the first and second carbon face seal rings, wherein the first spring is axially engaged with a first portion of the annular housing and the second spring is axially engaged with a second portion of the annular housing, wherein the first spring biases the first carbon face seal ring in the axial first direction and the second spring biases the second carbon face seal ring in the axial second direction opposite the axial first direction, and
the first and second carbon face seal rings positioned to seal directly against the power output shaft and the stub shaft respectively or positioned to seal against first and second running rings mounted on the power output shaft and the stub shaft respectively.

19. The gas turbine engine assembly as claimed in claim 18, further comprising:
annular first and second carriers mounted on and supported by the annular housing,
the first and second carriers supporting the first and second carbon face seal rings respectively, and
the first and second springs operably and axially disposed between the annular housing and the first and second carriers respectively.

20. The gas turbine engine assembly as claimed in claim 19, further comprising inner and outer secondary seals including inner and outer O rings disposed in annular inner and outer grooves in annular inner and outer surfaces along a radial direction in the housing respectively and in sealing engagement with the first and second carriers.

* * * * *